US010294639B2

(12) United States Patent
Guerry

(10) Patent No.: US 10,294,639 B2
(45) Date of Patent: May 21, 2019

(54) NONRETURN DEVICE FOR A PIPE FOR CARRYING A FLUID

(71) Applicant: GUERRY INNOVATION, Cantenay-Epinard (FR)

(72) Inventor: Stephane Guerry, Cantenay-Epinard (FR)

(73) Assignee: GUERRY INNOVATION, Cantenay-Epinard (FR)

(*) Notice: Subject to any disclaimer, the term of this patent is extended or adjusted under 35 U.S.C. 154(b) by 0 days.

(21) Appl. No.: 15/564,931

(22) PCT Filed: Apr. 11, 2016

(86) PCT No.: PCT/FR2016/050828
§ 371 (c)(1),
(2) Date: Oct. 6, 2017

(87) PCT Pub. No.: WO2016/166458
PCT Pub. Date: Oct. 20, 2016

(65) Prior Publication Data
US 2018/0094410 A1 Apr. 5, 2018

(30) Foreign Application Priority Data
Apr. 13, 2015 (FR) .................... 15 53176

(51) Int. Cl.
F16K 17/00 (2006.01)
E03B 7/07 (2006.01)
(Continued)

(52) U.S. Cl.
CPC ............ E03B 7/077 (2013.01); E03C 1/10 (2013.01); E03C 1/104 (2013.01); F16K 17/386 (2013.01); Y10T 137/773 (2015.04)

(58) Field of Classification Search
CPC ........... F16K 17/386; E03C 1/10; E03B 7/077
(Continued)

(56) References Cited

U.S. PATENT DOCUMENTS 826,530 A * 7/1906 Bell .................. F16K 17/00
137/463
844,923 A * 2/1907 Cridge ............... F16K 17/00
137/463
(Continued)

FOREIGN PATENT DOCUMENTS

| DE | 198 40 315 C1 | 10/1999 |
| EP | 0 351 806 A2 | 1/1990 |
| FR | 2 469 630 A | 5/1981 |
| WO | 00/04310 A2 | 1/2000 |

OTHER PUBLICATIONS

International Search Report, dated Sep. 26, 2016, from corresponding PCT/FR2016/050828 application.

*Primary Examiner* — Umashankar Venkatesan
(74) *Attorney, Agent, or Firm* — Young & Thompson

(57) ABSTRACT

Disclosed is a nonreturn device for a pipe for carrying a fluid, including —a shut-off valve provided with actuating element including a device for accumulating/releasing potential energy, —a nonreturn valve designed to maintain a pressure difference ΔP between its inlet and its outlet, and —a triggering piston, the internal volume of which is divided into two chambers by a mobile element which is equipped with an activation rod; the first and second chambers are in fluidic communication with the pipe, respectively upstream and downstream of the nonreturn valve; and the activation rod of the triggering piston is designed to be able to actuate the shut-off valve in order to move it from its inactive position into its active position if the pressure difference ΔP drops below a predetermined threshold value, with the release of the potential energy accumulated in the device.

19 Claims, 2 Drawing Sheets

(51) Int. Cl.
*E03C 1/10* (2006.01)
*F16K 17/38* (2006.01)

(58) Field of Classification Search
USPC .......................................................... 137/463
See application file for complete search history.

(56) References Cited

U.S. PATENT DOCUMENTS

| | | | | |
|---|---|---|---|---|
| 864,236 | A * | 8/1907 | Fairbanks | F16K 17/00 |
| | | | | 137/463 |
| 933,880 | A * | 9/1909 | Brown | F16K 17/00 |
| | | | | 137/463 |
| 1,010,834 | A * | 12/1911 | Westburg | F16K 17/00 |
| | | | | 137/463 |
| 1,170,831 | A * | 2/1916 | Lewis | F16K 17/00 |
| | | | | 137/463 |
| 1,617,156 | A * | 2/1927 | Hardway | F16K 17/00 |
| | | | | 137/463 |
| 1,677,729 | A * | 7/1928 | Sams | F16K 17/00 |
| | | | | 137/463 |
| 2,417,357 | A * | 3/1947 | Griswold | E03C 1/104 |
| | | | | 137/492 |
| 2,658,521 | A * | 11/1953 | Lyon | F16K 31/563 |
| | | | | 137/461 |
| 2,773,251 | A | 12/1956 | Snyder | |
| 4,332,274 | A | 6/1982 | Frisquet | |
| 6,550,495 | B1 | 4/2003 | Schulze | |
| 8,474,480 | B1 * | 7/2013 | Scantlin | F16K 17/406 |
| | | | | 137/102 |

* cited by examiner

NONRETURN DEVICE FOR A PIPE FOR CARRYING A FLUID

TECHNICAL FIELD TO WHICH RELATES THE INVENTION

The present invention relates to a nonreturn device for a pipe for carrying a fluid (gas, liquid or also solid-filled gas/liquid), for the purpose of preventing any rising of this fluid in said pipe.

TECHNOLOGICAL BACK-GROUND

There exist many safety systems or devices, adapted to prevent such fluid rising in a supply pipe.

The most common systems consist in valves that may be of different types: ball-type, swing-type, disc-type ..., but that are very generally not very reliable.

More complex and more reliable systems, generally called "disconnectors", are also used for example to prevent the return of a polluted water (coming from a central heating network, a cooling tower ...) towards a circuit of drinking water intended to be drunk.

Within this framework, nonreturn valve systems are known, which are adapted to maintain a pressure difference between their inlet and their outlet, associated with a shut-off gate of the two-active/inactive-position type, provided with a mobile selector element associated with actuating means.

But these systems generate significant head losses and/or require high pressure differences for operating, because it is the energy, linked to the pressure difference at the terminals of the valve, or of a piston, which acts directly on the gate.

Moreover, by principle, these disconnectors require, for operating, a venting of the fluid in the downstream circuit in case of inversion of the pressure gradient.

It is known from the document FR-2 469 630 a disconnector for drinking-water pipe operating by means of a hollow piston sliding axially in a hollow body, between two extreme stops, in one direction under the action of the upstream pressure, and in the other direction under that of an antagonistic spring, coming in addition to the downstream pressure.

But a drawback of such a system is that it requires high head losses for operating.

Moreover, the circulation of fluid in the normal direction is possible again as soon as the minimum pressure gradient is restored. The system also requires a venting of the downstream circuit because, otherwise, it fulfils the same function as a nonreturn valve.

On the other hand, by nature, it is operational only for piston gates.

Another known nonreturn device is described in the document WO-00/04310 relating to the gases carried by pipelines.

The corresponding device is in the form of a gate controlled by an pressure-sensitive element in which the pressure rises as a function of the temperature (to detect a peripheral fire). Herein, the device is sensitive to the pressure inside the sensitive element, and not to a pressure difference at the terminals of the nonreturn valve.

Still another known nonreturn system is described in the document U.S. Pat. No. 2,773,251.

This pipe nonreturn device includes a nonreturn valve adapted to maintain a fluid pressure difference $\Delta P$ between its inlet and its outlet, and a shut-off gate, the actuation means of which consists in an electromagnet operating in closure based on a current that circulates when the electric circuit is closed. It also includes a triggering piston having a body delimiting an internal volume separated into two chambers by a mobile element that is equipped with an activation rod, these two chambers being in fluidic communication with said pipe, upstream and downstream of said nonreturn valve, respectively.

The activation rod moves under the action of the mobile element as a function of the pressures inside the two chambers and it closes the electric circuit, to activate the shut-off gate, when the fluid pressure difference $\Delta P$ exceeds a threshold value.

The mobile element is subjected to action of a spring system that determines its position to adjust the threshold for the closure of the electric circuit.

But such a nonreturn system has the drawback that it requires a supply of electric power for operating.

OBJECT OF THE INVENTION

The present invention has for object to propose a nonreturn device for a fluid-carrying pipe, which is reliable, very safe, and which generates only a low pressure loss. This device does not need a significant pressure difference for being activated; moreover, it requires no external supply of electric, pneumatic or hydraulic power source.

For that purpose, the nonreturn device according to the invention, for a fluid-carrying pipe, includes, positioned on said pipe:
  a shut-off gate of the two-position type, an active one for shutting said pipe, and an inactive one, wherein said gate is provided with a mobile selector element associated with actuation means,
  a nonreturn valve having an inlet and an outlet, taking into account the normal direction of displacement of the fluid, adapted to maintain a fluid pressure difference $\Delta P$ between said inlet and said outlet, and
  a triggering piston having a body delimiting an internal volume separated into two chambers by a mobile element that is equipped with an activation rod,
a first one of said chambers being in fluidic communication with said pipe downstream from said nonreturn valve, and a second one of said chambers being in fluidic communication with said pipe upstream from said nonreturn valve; moreover, said actuation means are provided with a device for accumulating/releasing potential energy (for example, spring, magnet, counterweight ...), adapted to accumulate potential energy when said shut-off gate passes from its active position to its inactive position, and adapted to release said potential energy when said shut-off gate passes from its inactive position to its active position;
and said activation rod of said triggering piston is adapted to be able to actuate said actuation means of the selector element of said shut-off gate, in order to operate the latter from its inactive position to its active position, in the case where said pressure difference $\Delta P$ passes under a predetermined threshold, with release of the potential energy accumulated by said device for accumulating/releasing potential energy.

Such a device, operating by release of previously accumulated potential energy, and hence mechanically activated, requires no supply of external source of electric, pneumatic or hydraulic energy for being implemented.

In a preferred embodiment, said nonreturn valve is positioned downstream from said shut-off gate, said second chamber of the triggering piston being in fluidic communication with said pipe downstream from said shut-off gate.

The activation rod of the triggering piston is advantageously mechanically linked to said mobile element of said triggering piston, or by a magnetic coupling.

According to another feature, the nonreturn device includes a fluid evacuation gate, of the two-position type, an inactive one, and an active one, in which it is adapted to ensure the transfer of the fluid coming from the downstream of said pipe, to a secondary evacuation pipe. This evacuation gate is provided with a mobile selector element associated with actuation means that are adapted to be actuated by said activation rod of said triggering piston, in order to operate said evacuation gate from its inactive position to its active position, simultaneously to the operation of said shut-off gate to the active position.

This evacuation gate may consist in a gate whose selector element is of the three-way type, and that is positioned on said fluid-carrying pipe upstream from said shut-off gate, one of said ways of said evacuation gate being connected to said secondary pipe.

In an alternative embodiment, the evacuation gate consists in a gate whose selector element is of the open/closed type and it is positioned at the inlet of said secondary evacuation pipe that is connected to said fluid-carrying pipe, between said shut-off gate and said nonreturn valve.

According to still another characteristic, the actuation means of the mobile selector element of the shut-off gate, and potentially the actuation means of the mobile selector element of the evacuation gate, include an operating arm associated with a mobile actuation trigger, wherein said trigger includes a seat adapted to bear against a retractable stop carried by said actuation rod of said triggering piston, under the effect of said device for accumulating/releasing potential energy;

this actuation trigger is then adapted to occupy two positions:
- a locked one, in which said seat bears against said retractable stop, said shut-off gate, and said potential evacuation gate, being in inactive position, through their respective operating arm, and
- an unlocked one, in which, after retraction of said retractable stop, said seat does not bear against said stop and in which said shut-off gate, and said potential evacuation gate, are in active position, through their respective operating arm.

The nonreturn valve according to the invention still includes pusher means for the manual operation—of the actuation trigger of the actuation means of said shut-off gate,—of the potential actuation trigger of said potential evacuation gate, and—of the mobile element of the triggering piston, from their unlocked position to their locked position.

According to another feature, the mobile element of the triggering piston consists in a deformable membrane. In an alternative embodiment, this mobile element of the triggering piston consists in a piston that is mobile in translation within the body of said triggering piston.

The shut-off and/or evacuation gates are advantageously of the rotary slide gate or of the pressure-retaining gate type.

Still according to a preferential characteristic of the invention, one at least of said first or second chambers of the body of the triggering piston includes a return means adapted to adjust the triggering pressure threshold of the triggering piston.

DETAILED DESCRIPTION OF THE INVENTION

The invention will be further illustrated, without be limited in anyway, by the following description of several possible embodiments given only by way of examples and shown in the appended drawings, in which.

Figure 1:
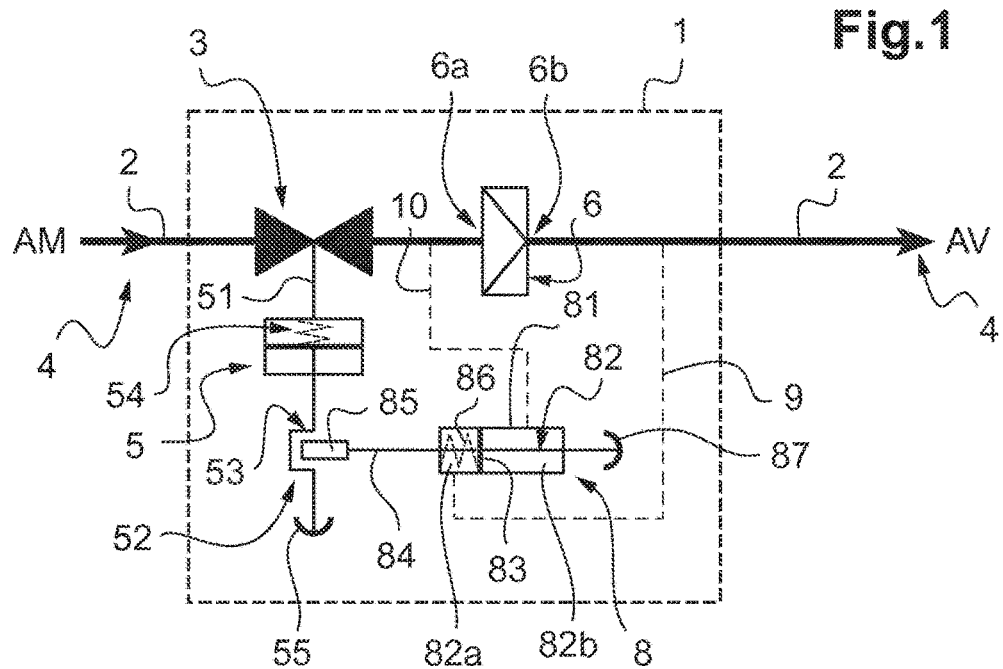
FIG. 1 is a block diagram of a nonreturn device according to the invention, in a locked, inactive position.
Figure 2:
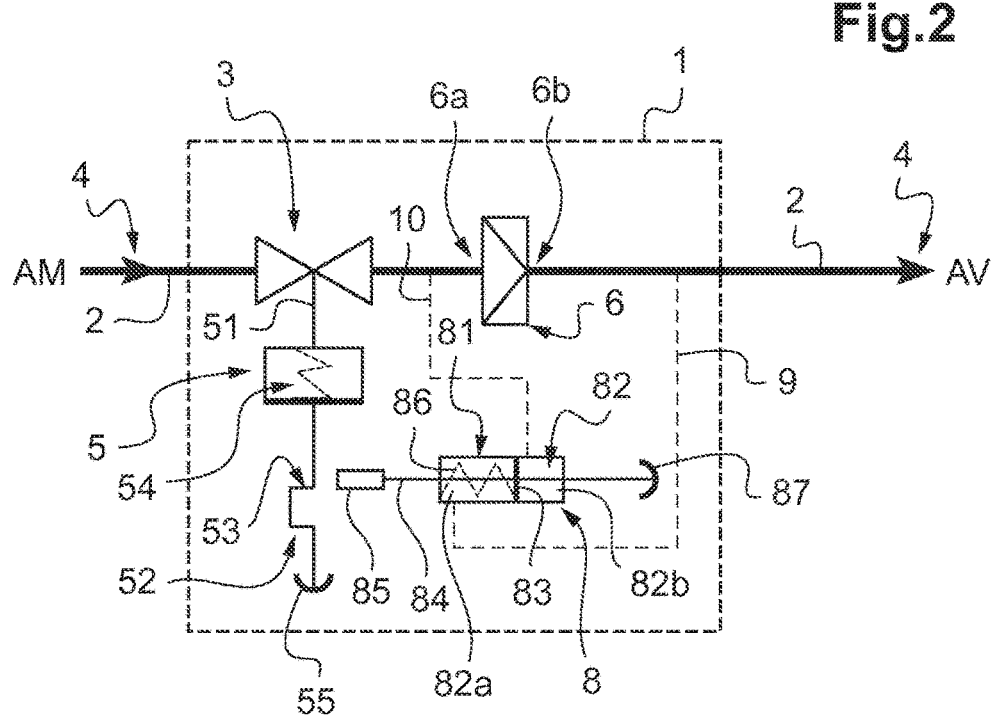
FIG. 2 is a block diagram of the nonreturn device of FIG. 1, shown herein in the unlocked, active position.

FIGS. 1 and 2 illustrate a first embodiment of a nonreturn device 1 according to the invention, for a fluid-carrying pipe 2, for the purpose of preventing any rising of this fluid, from the downstream to the upstream.

The fluid in question may be a liquid or a gas (for example, a liquid or a gas such as water, gaseous or liquid nitrogen, compressed air, natural gas, hydrogen, sludge . . . ).

The nonreturn device 1 includes a shut-off gate 3, positioned on the pipe 2, herein a gate of the two-position type:
- an inactive position (FIG. 1) in which the gate 3 lets the fluid pass through the pipe 2, from the upstream AM to the downstream AV, as indicated by the orientation arrows 4, and
- an active position (FIG. 2) in which the gate 3 shuts the pipe 2, preventing the passage of the fluid.

Any type of suitable gate 3 may be used, in particular a rotary slide gate or a pressure-retaining gate, as a function of the related fluid and of the designer choices.

The shut-off gate 3 is provided with an integrated mobile selector element (not shown), associated with actuation means 5 detailed hereinafter in the description.

A nonreturn valve 6 is also positioned on the pipe 2, downstream from the shut-off gate 3.

This nonreturn valve 6 is adapted to allow the displacement of the fluid in the pipe 2 only in the upstream AM to downstream AV direction.

It includes an inlet 6a and an outlet 6b, taking into account the normal direction of displacement of the fluid (upstream to downstream); and it is adapted to maintain a fluid pressure difference $\Delta P$ between said inlet 6a and said outlet 6b.

The nonreturn valve 6 may be of the disc type, the ball type, the flapper type or another type.

The nonreturn device 1 also includes a triggering piston 8 whose function is to control the passage of the shut-off gate 3 from its inactive position to its active position when the fluid pressure difference $\Delta P$ between the inlet 6a and the outlet 6b of the nonreturn valve 6 exceeds a predetermined threshold.

For that purpose, the triggering piston 8 includes a body 81 that delimits an internal volume 82 separated into two chambers 82a and 82b by a mobile element 83 mechanically linked to an activation rod 84.

This mobile element 83 may for example be in the form of a deformable membrane or in the form of a piston mobile in translation within the body 81.

The two chambers 82a and 82b are separated from each other in a tight manner by the mobile element 83.

The first chamber 82a is in fluidic communication with the pipe 2, downstream from the nonreturn valve 6, through a pipe 9.

For its part, the second chamber 82b is in fluidic communication with the pipe 2, upstream from the nonreturn valve 6 and downstream from the shut-off gate 3, through a pipe 10.

The rod 84 of the triggering piston 8 extends, from the mobile element 83, into the first chamber 82*a* of the body 81; it passes through this first chamber 82*a* and it extends externally to said body 81. Its free end is terminated by a retractable stop 85, of which it is understood that the positioning is controlled by the mobile element 83.

This retractable stop 85 cooperates with the actuation means 5 of the gate 3 to manage the active and inactive positions of the latter.

For that purpose, the actuation means 5 include a mobile arm 51, adapted to operate the mobile selector element integrated to the gate 3. The operating arm 51 is associated with a mobile actuation trigger 52 provided with a seat 53 adapted to bear against said retractable stop 85 of the triggering piston 8, under the effect of return means 54. These return means 54 may consist in one or several springs, one or several spring washers, one or several magnets, or any other device adapted to store a potential energy permitting to operate one or several gates.

The principle of operation of the nonreturn device 1 is the following:

In normal situation of transportation of the fluid in the pipe 2 (FIG. 1), the nonreturn valve 6 allows maintaining a pressure difference ΔP between its inlet 6*a* and its outlet 6*b*, i.e. between the upstream AM and the downstream AV.

The triggering piston 8/actuation means 5 unit is in locked (or armed) position, i.e. the seat 53 of the actuation trigger 52 bears on the retractable stop 85 under the effect of return means 54, the operating arm 51 maintaining the selector element of the gate 3 in the inactive position to allow the passage of the fluid.

The gate 3 is hence in open position.

This open position is maintained since the retractable stop 85 does not change of position and hence since the pressures are balanced in the first and second chambers 82*a* and 82*b* of the piston 8, on either side of the mobile element 83.

In case of attempt of fluid rising in the network, from the downstream AV to the upstream AM, the pressure difference ΔP evolves between the inlet 6*a* and the outlet 6*b* of the valve 6, and also in the chambers 82*a*, 82*b* of the triggering piston 8.

When this pressure difference ΔP passes under a certain predetermined threshold, the retractable stop 85 has been sufficiently displaced by the mobile element 83 so as not to serve as a bearing to the seat 53 of the actuation trigger 52.

As illustrated in FIG. 2, the actuation trigger 52 then moves under the effect of the return means 54 (releasing the accumulated potential energy), causing the displacement of the operating arm 51, and as a consequence that of the selector element integrated to the shut-off gate 3, to place the latter in the active position for shutting the pipe 2.

The structure of the actuation means 5 is adapted accordingly; and the closure of the shut-off gate 3 allows preventing the attempt of fluid rising in the pipe 2, in addition to the first barrier consisted by the valve 6. The predetermined threshold of pressure difference ΔP for the triggering of the device is chosen as a function of the admissible head loss in the network and of the pressure effort to be exerted in the triggering piston 8 and on the actuation means 5.

In FIGS. 1 and 2, it can be observed the presence of a return means in the form of a spring 86, arranged within the piston body 81, having for function to adjust accurately the triggering pressure threshold of the triggering piston 8.

This spring 86 is herein provided in the chamber 82*a* of the piston body 81, but it could also be present in the chamber 82*b* or on either side of the mobile element 83 (in the chambers 82*a* and 82*b*), in particular according to the orientation of the triggering piston 8 with respect to the gravity, according to the losses linked to the frictions, or according to the efforts to be provided to operate the activation rod 84.

Moreover, if the mobile element 83 consists in a deformable membrane, this function of triggering pressure adjustment may also be ensured by a suitable membrane.

After the triggering thereof for closing the gate 3 (and after solving of the problem of fluid rising in the network), the actuation trigger 52 may be manually retriggered by suitable operation means.

As can be seen in FIGS. 1 and 2, these operation means advantageously consist in:

a pusher means 55 allowing the displacement of the trigger 52 and of the seat 53 thereof against the thrust of the return spring 54, and a pusher means 87 allowing the displacement of the rod 84 of the triggering piston 8 and of the retractable stop 85 thereof for the repositioning of the later in rest against the trigger seat 53 (against the thrust of the return spring 86).

The manual operation of the two pusher means 55 and 87 allows the holding of the retriggering of the actuation trigger 52 only if the pressure difference ΔP around the nonreturn valve 6 is correctly established.

The corresponding retriggering ensures the resetting in inactive position of the shut-off gate 3, safely waiting for a new potential problem.

It will be noted that the link between the mobile element 83 of the triggering piston 8 and the operating rod 84 thereof (with the retractable stop 85) may be performed by any suitable mechanical means or also by a magnetic coupling.

In an alternative embodiment, the shut-off gate 3 may be positioned downstream from the nonreturn valve 6.

The nonreturn device 1 according to the invention is fully mechanical and requires no energy supply for performing its circuit closing action (except the energy required for the retriggering).

The triggering piston 8 operates with the fluid carried by the pipe 2.

The triggering event corresponds to a passage under a certain pressure value, and the device triggers the closure of the gate 3 at each solicitation; the return to a normal situation of distribution of the fluid requires a manual intervention.

Such a system is more reliable than a simple nonreturn valve due to the fact that it is consisted of a double barrier (a valve and a gate).

Moreover, as stated hereinabove, when the device has been solicited (triggering), it is necessary to implement a manual action of retriggering to restore the fluid distribution function, which involves a voluntary intervention and corresponds to an additional security.

Moreover, the triggering of the shut-off gate 3 and the tightness of the nonreturn valve 6 may be easily tested without dismounting the equipment, by isolating the device (stopping the flow) then by balancing the pressures upstream and downstream of the nonreturn valve 6 or of the triggering piston 8 by means of a complementary gate and a differential manometer, allowing to connecting both sides of the triggering piston 8.

Contrary to the existing systems of the disconnector type, such a device requires no significant pressure difference to actuate the shut-off gate, and it may hence be used with low-pressure fluids.

It moreover generates a low pressure loss (only linked to the head loss and to the pressure of opening of the nonreturn valve), thanks to the separation of the control stage (linked to the pressure difference) and of the power stage (closure of the shut-off gate with a return means 54 when the actuation trigger 52 moves).

Still another difference with a system of the disconnector type lies in the fact that the process fluid part is not mandatory placed into contact with the external atmosphere of the device, which may prove very important for the sterile networks for example, or for the fluids reacting to the air or to the external atmosphere of the pipe.

The nonreturn device 1 according to the invention is not sensitive to the internal and external pressures, but only to the pressure difference in the internal fluid circuit.

The accuracy of the triggering is linked to the adjustment of the triggering piston 8 (the triggering pressure must be lower than the set pressure of the nonreturn valve 6, but may also be null or negative, the only constraint being that the triggering pressure is lower than the set pressure of the nonreturn valve).

To limit the head losses in the fluid network, the nonreturn valve 6 may be set to 0 bar, in which case a negative pressure difference will be necessary for actuating the triggering piston 8.

It will be noted that, for uses with gaseous fluids, a setting of the nonreturn valve 6 with a pressure slightly higher than 0 bar (a few millibars) will be preferred; settings to 0 bar will be rather usable with liquid fluids (because the manometric height on the triggering piston 8 can act, which is not the case with the gaseous fluids, as a function of the orientation of the chambers of the piston 8 with respect to the gravity of Earth).

Figure 3:
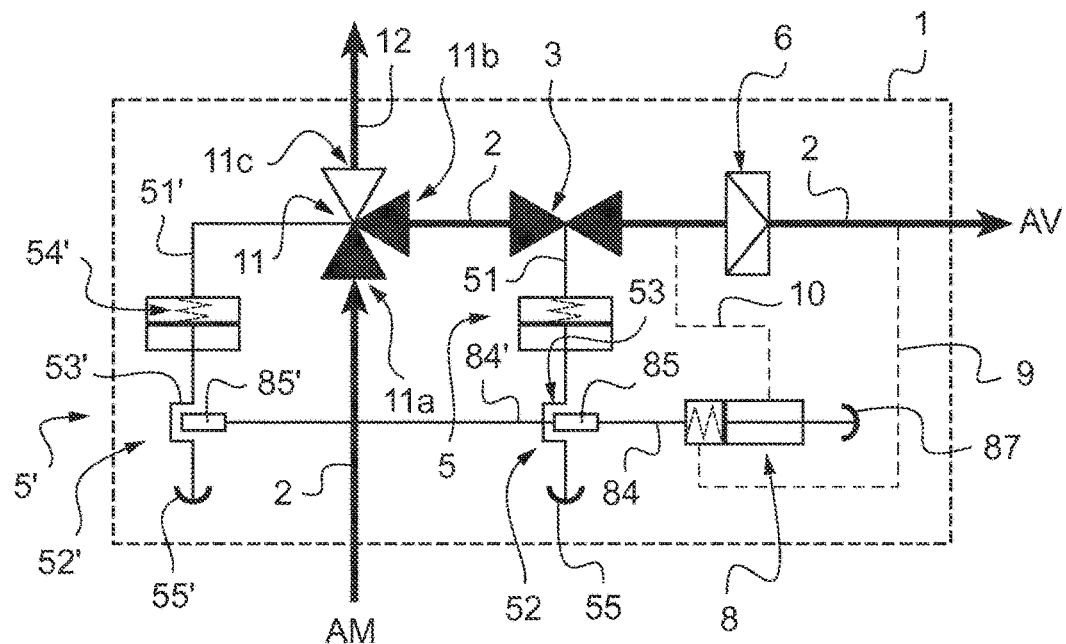
FIG. 3 is a block diagram of a second possible embodiment of the nonreturn device according to the invention.
Figure 4:
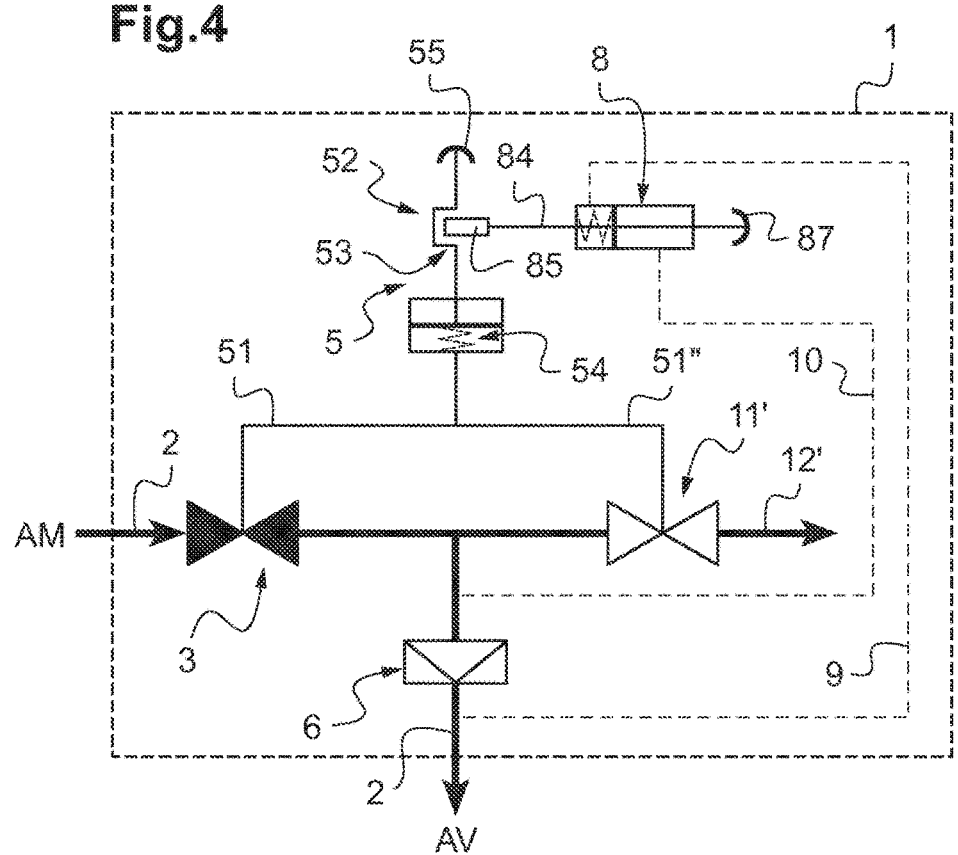
FIG. 4 illustrates a third possible embodiment of the nonreturn device according to the invention, still as a block diagram.

FIGS. 3 and 4 schematically illustrate two alternative embodiments of the nonreturn device according to the invention, including an additional security, in the form of a suitable evacuation gate, in case of detection of an attempt of fluid rising from the downstream AV to the upstream AM, to ensure the transfer of the fluid liable to come from the downstream of the network, to a secondary evacuation pipe (i.e. for a venting of this upstream fluid).

In FIGS. 3 and 4, the parts or functional elements that are identical or similar to the first embodiment illustrated in FIGS. 1 and 2 keep the same references by way of simplification.

Generally, in the two alternative embodiments of FIGS. 3 and 4, we find, positioned on the pipe 2:
the shut-off gate 3 with its actuation means 5,
the nonreturn valve 6 (positioned downstream of the shut-off gate 3), and
the triggering piston 8,
which cooperate together as detailed hereinabove in relation with FIGS. 1 and 2.

In the embodiment illustrated in FIG. 3, an evacuation gate of the three-way type 11 is placed on the pipe 2 downstream from the shut-off gate 3.

This three-way gate 11 includes:
a first way 11a connected to the upstream AM of the pipe 2,
a second way 11b connected to the downstream of the pipe 2 (i.e. on the shut-off gate 3 side), and
a third way 11c connected to a secondary evacuation pipe 12.

This three-way gate 11 is provided with an internal mobile selector element (not shown), associated with actuation means 5'; it is of the two-position type, i.e.:
a so-called inactive position (as illustrated in FIG. 3) in which the ways 11a and 11b are connected to allow the passage of the fluid in the pipe 2, from the upstream AM to the downstream AV (normal distribution of the fluid in the pipe 2), and
a so-called active position, in which the ways 11b and 11c are connected, to allow the transfer of a fluid coming from the downstream (i.e. from the shut-off gate 3, to the secondary evacuation pipe 12 (for a venting of this fluid). In this activate position, the ways 11a and 11b are no longer in communication.

The actuation means 5' are identical or similar to the actuation means 5 of the shut-off gate 3; they comprise a mobile arm 51' adapted to operate the mobile selector element of the gate 11, wherein the operating arm 51' is associated with a mobile actuation trigger 52' provided with a seat 53'. Under the effect of a return spring 54', this trigger 52' is adapted to bear against a retractable stop 85' arranged at the end of a rod 84' in mechanical link with the rod 84 of the triggering piston 8.

In this case, the rod 84' of the actuation means 5' of the evacuation gate 11 herein extends the rod 84 of the triggering piston 8 associated with the shut-off gate 3 and with the nonreturn valve 6.

The triggering piston 8 hence herein actuates simultaneously:
the actuation trigger 52 of the actuation means 5 of the shut-off gate 3, in a manner identical or similar to the embodiment of FIGS. 1 and 2, and
the actuation trigger 52' of the actuation means 5' of the evacuation gate 11.

In normal situation of transportation of the fluid in the pipe 2, from the upstream AM to the downstream AV, the evacuation gate 11 and the shut-off gate 3 are in inactive position.

In case of detection of an attempt of fluid rising in the network, from the downstream AV to the upstream AM, the triggering piston 8 actuates:
the shut-off gate 3 to the active closing position, via the actuation means 5 associated with the retractable stop 85, as detailed in relation with FIGS. 1 and 2, and
the evacuation gate 11 to the active position, on the one hand, for the putting in communication of the ways 11b and 11c thereof, in order to allow the passage of the fluid coming from the downstream, in the evacuation pipe 12, and on the other hand, to prevent the communication of its ways 11a and 11b, in order to block the fluid coming from the upstream. This putting in active position of the evacuation gate 11 is performed via the actuation means 5' associated with the retractable stop 85'.

In such a configuration, the shut-off gate 3 serves as a first shut-off barrier and the evacuation gate 11 allows cutting the supply of the fluid and putting the use side in communication with the evacuation pipe 12, to receive the fluid, in case of leak of the shut-off gate 3 (for example linked to a too high pressure return, which cannot be stopped by said shut-off gate 3).

The actuation means 5' include a pusher means 55' for the manual resetting thereof to the locked position, simultaneously to the manual resetting to the locked position of the actuation means 5 (by the above-mentioned pusher means 55 and 87).

The device is then replaced in the safety position, waiting for a new potential abnormal situation.

In the embodiment illustrated in FIG. 4, an evacuation gate 11' is placed at the inlet of a secondary evacuation pipe 12' that is connected to the main carrying pipe 2, between the shut-off gate 3 and the nonreturn valve 6.

This evacuation gate 11' is provided with an internal mobile selector element (not shown), that is actuated by the actuation means 5 of the triggering piston 8, in particular through an operating arm 51" extending the operating arm 51 of the shut-off gate 3, or in mechanical engagement with this arm 51.

The gate 11' is of the two-open/closed-position type, i.e.:
an inactive position (closed) preventing the passage of the fluid towards the downstream of the evacuation pipe 12', and
an active position (open) allowing the passage of the fluid towards the downstream of evacuation pipe 12'.

Herein, the triggering piston 8 actuates simultaneously the operating arms 51 and 51", of the shut-off gate 3 and of the evacuation gate 11', respectively, through the same actuation trigger 52.

In normal situation of transportation of the fluid in the pipe 2, from the upstream AM to the downstream AV, the two gates 3 and 11' are in the inactive position (shut-off gate 3 open and evacuation gate 11' closed).

In case of detection of an attempt of fluid rising in the network, from the downstream AV to the upstream AM, the triggering piston 8 actuates the shut-off gate 3 to the active closing position, via the operating arm 51 of the actuation means 5, and the evacuation gate 11' to the active opening position, via the operating arm 51" of the actuation means 5.

The configuration is interesting when it is not desired or impossible to use a three-way gate, but that it is desired to also perform a venting.

In the structures of the alternative embodiments illustrated in FIGS. 3 and 4, the evacuation gates 11 and 11' may be gates of the rotary type (ball-type for example) or of the pressure-retaining type (membrane or butterfly type, for example). The different gates may be of any type, excepted the valve 11 that must be a multi-way gate (sliding gate, spherical gate, conical gate ... ), the type of gate is chosen in particular as a function of the characteristics of the fluid to be transported.

Generally, the different constitutive elements of the device according to the invention, and the structure of this device, in particular with or without evacuation gate, will be chosen as a function of the situations in presence and of the products (liquid or gas) to be transported.

The arms for the control of the shut-off and possibly evacuation gates are structured so as to suitably actuate the mobile selector element of these gates, based on the movements of the associated actuation trigger.

The invention claimed is:

1. A nonreturn device (1) for a fluid-carrying pipe (2), said nonreturn device (1) includes, positioned on said pipe (2):
a shut-off gate (3) of the two-position type, an active one for shutting said pipe (2), and an inactive one, provided with a mobile selector element associated with actuation means (5),
a nonreturn valve (6) including an inlet (6a) and an outlet (6b), taking into account the normal direction of displacement of the fluid, adapted to maintain a fluid pressure difference ΔP between said inlet (6a) and said outlet (6b), and
a triggering piston (8) comprising a body (81) delimiting an internal volume (82) separated into two chambers (82a, 82b) by a mobile element (83) that is equipped with an activation rod (84),
a first one of said chambers (82a) being in fluidic communication with said pipe (2) downstream from said nonreturn valve (6), and
a second one of said chambers (82b) being in fluidic communication with said pipe (2) upstream from said nonreturn valve (6),
wherein said actuation means (5) of said shut-off gate (3) are provided with a device for accumulating/releasing potential energy (54, 54'), adapted to accumulate potential energy when said shut-off gate (3) passes from its active position to its inactive position, and adapted to release said potential energy when said shut-off gate (3) passes from its inactive position to its active position,
said activation rod (84) of said triggering piston (8) being adapted to be able to actuate said actuation means (5) of the selector element of said shut-off gate (3), in order to operate the latter from its inactive position to its active position, in the case where said pressure difference ΔP passes under a predetermined threshold, with release of the potential energy accumulated by said device for accumulating/releasing potential energy (54, 54),
wherein the actuation means (5) of the mobile selector element of said shut-off gate (3), include an operating arm (51) associated with a mobile actuation trigger (52),
wherein said trigger (52) includes a seat (53) adapted to bear against a retractable stop (85) carried by said actuation rod (84) of said triggering piston (8), under the effect of said device for accumulating/releasing potential energy (54),
wherein said actuation trigger (52) is then adapted to occupy two positions:
a locked one, in which said seat (53) bears against said retractable stop (85), said shut-off gate (3) being in inactive position through the operating arm (51), and
an unlocked one, in which, after retraction of said retractable stop (85), said seat (53) does not bear against said stop (85), and in which said shut-off gate (3) is in active position, through the operating arm (51).

2. The nonreturn device (1) according to claim 1, wherein said nonreturn valve (6) is positioned downstream from said shut-off gate (3), said second chamber (82b) of said triggering piston (8) being in fluidic communication with said pipe (2) downstream from said shut-off gate (3).

3. The nonreturn device (1) according to claim 1, wherein said activation rod (84) is mechanically linked to said mobile element (83) of said triggering piston (8), or by a magnetic coupling.

4. The nonreturn device (1) according to claim 1, further comprising pusher means (55) for the manual operation—of the actuation trigger (52) of the actuation means (5) of said shut-off gate (3), and—of the mobile element (83) of the triggering piston (8), from their unlocked position to their locked position.

5. The nonreturn device (1) according to claim 1, wherein the mobile element (83) of the triggering piston (8) consists in a deformable membrane.

6. The nonreturn device (1) according to claim 1, wherein the mobile element (83) of the triggering piston (8) consists in a piston that is mobile in translation within the body (81) of said triggering piston (8).

7. The nonreturn device (1) according to claim 1, wherein one at least of said first and second chambers (82a, 82b) of the body (81) of the triggering piston (8) includes a return means (86) adapted to adjust the triggering pressure threshold of the triggering piston (8).

8. The nonreturn device (1) according to claim 1, wherein said shut-off gate (3) is of the rotary slide valve type.

9. The nonreturn device (1) according to claim 1, wherein said shut-off gate (3) is of the pressure-retaining valve type.

10. A nonreturn device (1) for a fluid-carrying pipe (2), said nonreturn device (1) comprising, positioned on said pipe (2):
- a shut-off gate (3) of the two-position type, an active one for shutting said pipe (2), and an inactive one, provided with a mobile selector element associated with actuation means (5),
- a nonreturn valve (6) including an inlet (6a) and an outlet (6b), taking into account the normal direction of displacement of the fluid, adapted to maintain a fluid pressure difference ΔP between said inlet (6a) and said outlet (6b), and
- a triggering piston (8) comprising a body (81) delimiting an internal volume (82) separated into two chambers (82a, 82b) by a mobile element (83) that is equipped with an activation rod (84),
- a first one of said chambers (82a) being in fluidic communication with said pipe (2) downstream from said nonreturn valve (6), and
- a second one of said chambers (82b) being in fluidic communication with said pipe (2) upstream from said nonreturn valve (6),
wherein said actuation means (5) of said shut-off gate (3) are provided with a device for accumulating/releasing potential energy (54, 54'), adapted to accumulate potential energy when said shut-off gate (3) passes from its active position to its inactive position, and adapted to release said potential energy when said shut-off gate (3) passes from its inactive position to its active position,
said activation rod (84) of said triggering piston (8) being adapted to be able to actuate said actuation means (5) of the selector element of said shut-off gate (3), in order to operate the latter from its inactive position to its active position, in the case where said pressure difference ΔP passes under a predetermined threshold, with release of the potential energy accumulated by said device for accumulating/releasing potential energy (54, 54), and
- a fluid evacuation gate (11, 11') of the two-position type, an inactive one, and an active one in which it is adapted to ensure the transfer of the fluid coming from the downstream of said pipe (2), to a secondary evacuation pipe (12, 12'),
wherein said evacuation gate (11, 11') is provided with a mobile selector element associated with actuation means (5, 5') that are adapted to be actuated by said activation rod (84) of said triggering piston (8), in order to operate said evacuation gate (11, 11') from its inactive position to its active position, simultaneously to the operation of said shut-off gate (3) to the active position.

11. The nonreturn device (1) according to claim 10, wherein said evacuation gate (11) consists in a gate whose selector element is of the three-way type (11a, 11b, 11c), wherein said evacuation gate (11) is positioned on said fluid-carrying pipe (2) upstream from said shut-off gate (3), and one of said ways (11c) of said evacuation gate being connected to said secondary evacuation pipe (12).

12. The nonreturn device (1) according to claim 10, wherein said evacuation gate (11') consists in a gate whose selector element is of the open/closed type, wherein said evacuation gate (11') is positioned at the inlet of said secondary evacuation pipe (12') that is connected to said fluid-carrying pipe (2), between said shut-off gate (3) and said nonreturn valve (6).

13. The nonreturn device (1) according to claim 10, wherein the actuation means (5) of the mobile selector element of said shut-off gate (3), and the actuation means (5', 5) of the mobile selector element of the evacuation gate (11, 11'), include an operating arm (51, 51', 51") associated with a mobile actuation trigger (52, 52'), wherein said trigger (52, 52') includes a seat (53, 53') adapted to bear against a retractable stop (85, 85') carried by said actuation rod (84, 84') of said triggering piston (8), under the effect of said device for accumulating/releasing potential energy (54, 54'),
wherein said actuation trigger (52, 52') is then adapted to occupy two positions:
- a locked one, in which said seat (53, 53') bears against said retractable stop (85, 85'), said shut-off gate (3), and said evacuation gate (11, 11'), being in inactive position through their respective operating arm (51, 51', 51"), and
- an unlocked one, in which, after retraction of said retractable stop (85, 85'), said seat (53, 53') does not bear against said stop (85, 85'), and in which said shut-off gate (3), and said evacuation gate (11, 11'), are in active position, through their respective operating arm (51, 51', 51").

14. The nonreturn device (1) according to claim 13, further comprising pusher means (55, 55', 87) for the manual operation—of the actuation trigger (52) of the actuation means (5) of said shut-off gate (3),—of the actuation trigger (52') of the actuation means (5') of said potential evacuation gate (11), and—of the mobile element (83) of the triggering piston (8), from their unlocked position to their locked position.

15. The nonreturn device (1) according to claim 10, wherein said shut-off gate (3) and/or said evacuation gate (11, 11') is/are of the rotary slide valve type.

16. The nonreturn device (1) according to claim 10, wherein said shut-off gate (3) and/or said evacuation gate (11, 11') are of the pressure-retaining valve type.

17. The nonreturn device (1) according to claim 10, wherein the mobile element (83) of the triggering piston (8) consists in a deformable membrane.

18. The nonreturn device (1) according to claim 10, wherein the mobile element (83) of the triggering piston (8) consists in a piston that is mobile in translation within the body (81) of said triggering piston (8).

19. The nonreturn device (1) according to claim 10, wherein one at least of said first and second chambers (82a, 82b) of the body (81) of the triggering piston (8) includes a return means (86) adapted to adjust the triggering pressure threshold of the triggering piston (8).

* * * * *